United States Patent Office 3,541,032
Patented Nov. 17, 1970

3,541,032
PROCESS FOR THE PRODUCTION OF OIL-EXTENDED POLYBUTADIENE RUBBER
Gottfried Pampus, Leverkusen, Kurt Vohwinkel, Cologne-Stammheim, Nikolaus Schon, Leverkusen, and Josef Witte, Cologne-Stammheim, Germany, assignors to Farbenfabriken Bayer Aktiengesellschaft, Leverkusen, Germany, a corporation of Germany
No Drawing. Continuation of application Ser. No. 392,289, Aug. 26, 1964. This application Jan. 24, 1968, Ser. No. 700,294
Claims priority, application Germany, Sept. 7, 1963, F 40,704
Int. Cl. C08d 13/22, 5/02
U.S. Cl. 260—5             8 Claims

ABSTRACT OF THE DISCLOSURE

An oil-extended polybutadiene mixture comprising a cyclised polybutadiene and 30 to 70 parts by weight of a highly aromatic extender oil.

---

This application is a continuation of application S.N. 392,289, filed Aug. 26, 1964, now abandoned.

In the development of synthetic rubber, especially in the work on butadiene-styrene copolymers produced in emulsion, it has been found that synthetic rubber of high molecular weight (measured by its Mooney value) gives rise to vulcanisates which have very interesting technological properties. However, those rubbers which have Mooney values ML4' of about 60 to 140 have such bad processing properties that the preparation of homogeneous mixtures of reproducible qualities by some reasonably economical method is impossible. It has therefore been proposed, and this proposal is nowadays widely used in technology, to add plasticiser oils in large quantities (up to about 120% by weight) to relatively high molecular weight butadiene-styrene rubber. As is well-known, in order to obtain optimum processing and vulcanisate properties in this process, it is necessary to distribute the oil in a completely uniform manner in the rubber. In commercial processes, the oil is therefore added directly or as an emulsion to the rubber latex as obtained by the emulsion polymerisation process.

Mixtures of butadiene-styrene rubber and oil produced in this way can be processed easily and the technological properties of the vulcanisates are not substantially inferior to those of an oil free rubber having a correspondingly lower Mooney value. The use of synthetic rubber mixed with oil is of particular interest because it results in a very considerable reduction in cost of the mixtures. Therefore it was tried to mix high molecular weight polybutadiene produced by solution polymerisation with organometallic catalysts, which is also practically impossible to process but has excellent properties in the vulcanisate, with the known plasticising oils. The completely homogeneous distribution of oil, which is recognised to be essential in the case of butadiene-styrene rubber, is in this case effected automatically when the oil is added to the polymers solution.

However, it has ben found that the inadequate processing properties of pure high molecular weight polybutadiene are not sufficiently improved, especially in mixtures which contain besides polybutadiene and oil only small amounts of natural rubber or butadiene-styrene rubber. Moreover, the easy flowing of such polybutadiene-oil mixtures under their own weight is inadvantageous (very high cold flow).

A process has now been found in which the properties of oil extended polybutadiene rubber can be markedly improved with respect to the processing properties of suitable mixtures thereof, the technological qualities of the vulcanisates of polybutadiene rubbers mixed with oil and the properties of the crude unprocessed material itself. These improvements in the production of rubber-oil mixtures are effected according to the invention if (a) in the case of polymers of butadiene prepared in solution with organometallic catalysts and containing at least 85% of butadiene and up to 15% of styrene or isoprene and (b) in the case of mixtures of such polymers of butadiene with up to 30% by weight of natural rubber or styrene-butadiene rubbers, the polymers of butadiene are treated in solution with cyclising agents, before or after the addition of oil.

According to a preferred method of carrying out the process, pure polybutadienes, containing no further monomers are used, especially those which have a content of 1,4-cis linkages of about 80% or more and have Mooney values (ML4') between 60 and 120 after the cyclisation.

The considerable improvement in the processing properties of oil extended polybutadienes obtained in the process of this invention compared with a non-cyclised oil extended polybutadiene of the same Mooney value, is of great commercial value. According to this process better use can be made of the excellent properties of the polybutadiene rubber and mixtures thereof which contain small quantities of natural rubber or of styrene-butadiene rubber, especially of the stereospecific butadiene types.

According to a further particularly advantageous method of carrying out the present invention, the polymers of butadiene cyclised by the method described above are mixed with highly aromatic oils. These highly aromatic oils are preferably used in quantities between 30 and 70% by weight calculated on the butadiene polymer. Technological tests on such polybutadiene mixtures with highly aromatic oils in tread compounds have shown that a surprisingly great improvement is obtained by this procedure in the skid resistance which in polybutadiene still leave something to be desired in some cases.

The adhesiveness of the crude mixtures is also considerably improved, especially when highly aromatic oils are used. As is well known, the low adhesivness of polybutadiene gives rise to difficulties in the making up of tires, difficulties which can only be overcome by the addition of relatively large doses of tackifying agents (5 to 12 parts) which frequently bring about a deterioration in the elastic property. When using the oil-containing rubber according to the invention, tires can be manufactured without difficulty even with the addition of only normal quantities of tackifying agents (2 to 5 parts).

The use of paraffinic and naphthenic oil leads to oil-containing polybutadienes which produce vulcanisates with especially food elastic properties. It is also possible to use paraffinic, naphthenic or aromatic oils together in suitable proportions.

To carry out the process according to the invention, the butadiene monomer is first polymerised in known manner in aliphatic or aromatic hydrocarbons with the aid of organometallic catalysts such as organic lithium compounds, mixtures of titanium tetraiodide and aluminium trialkylene or of cobalt salts with alkyl aluminium halides. In this process, the quantity and composition of the catalyst should be adjusted so that at the end of polymerisation, a Mooney value (ML4') of 10 to 80, preferably 25 to 70, is obtained. The resulting solution has a polybutadiene content of 10 to 25%. This solution is treated with cyclising agents for 0.1 to 5 hours at temperatures above 15° C., preferably 20 to 80° C.

Although generally of little technical interest, the present process can also be readily applied to butadiene polymers produced with alkali metal catalysts (Buna type).

In principle, the known rubber cyclising agents are suitable for use as cyclising agents in this process provided they are soluble in the polymerisation medium. Examples are (a) halides of elements of Groups III–VI of the Periodic System, e.g. phosphorus oxychloride, phosphorus trichloride, sulphuryl chloride, thionyl chloride, titanium tetrachloride, silicon tetrachloride, tin tetrachloride, aluminium tribromide, boron fluoride and especially its addition products with ethers as well as aluminium chloride and its addition products with ketones and acid chlorides, (b) strong acids, i.e. acids which are practically completely dissociated in the first stage of dissociation, e.g. hydrochloric acid, sulphuric acid, orthophosphoric acid, p-toluene sulphonic acid and the halides of these acids.

The kind and quantity of these cyclising agents generally lies between about 0.1 and 5 millimols per 100 g. of rubber; it is preferably so calculated that after cyclisation, a product having a Mooney value of 65 to 120 is obtained.

If one wishes to carry out the after-treatment with the cyclising agent in such a manner that the Mooney value is increased only very slightly then it is preferable to use 0.3 to 2.0 millimols of cyclising agent calculated on 100 g. of polymer and brief reaction times (about 0.1 to 1 hour) and/or low temperatures (about 30 to 50° C.). If it is desired to use a polybutadiene having a relatively low Mooney value (ML4') of about 20 to 40, then it is preferable to use 1.0 to 5.0 millimols of cyclising agent for 100 g. of polybutadiene, and the after-treatment may be carried out at elevated temperatures (about 20 to 80° C.). If the cyclising process is carried out in this way then the loss in double bonds is always below 20%, usually below 5%, and no gel formation is observed.

Generally, the polymer is first subjected to cyclisation and the plasticiser oil is then added to the polymer solution. However, it may be advantageous in some cases to carry out the after-treatment in the presence of the oil. In both cases, it is advisable to add reaction inhibitors such as resinic acids or antioxidants such as sterically hindered phenols only after cyclisation is completed.

Suitable plasticisers are the paraffinic, naphthenic or aromatic mineral oils customarily used in the rubber industry, or their intermediates or oils of vegetable origin such as linseed oil. They may suitably be evaluated to a so-called viscosity-density constant (VDC), the following main distinctions being made:

| Viscosity density constant: | Classification of mineral oils |
|---|---|
| 0.790–0.819 | Paraffinic. |
| 0.820–0.849 | Relatively naphthenic. |
| 0.850–0.899 | Naphthenic. |
| 0.900–0.949 | Relatively aromatic. |
| 0.950–0.999 | Aromatic. |
| 1.000–1.049 | Highly aromatic. |
| >1.050 | Extremely aromatic. |

These oils are normally added in quantities of 20 to 120% by weight, preferably 30 to 70% by weight, calculated on the butadiene polymer, although these limits may be exceeded in special cases. The oil-containing polymer solution is finally worked up in known manner, the solvent being preferably removed by steam distillation and the moist lumps of rubber obtained being dried.

The oil-containing polybutadienes prepared according to the invention are eminently suitable for the production of tire treads and for the manufacture of technical articles and shoe soles which have especially good abrasion resistance and elastic properties and very little tendency to cracking.

The parts given in the examples below are parts by weight unless otherwise indicated.

EXAMPLE 1

(a) 100 parts of 1:3-butadiene were dissolved in 950 parts of dry toluene. 0.297 part of aluminium triisobutyl (in the form of a 25% solution in toluene) were added to this solution at 10° C. with exclusion of air and moisture, and a solution of 0.125 part of titanium butoxytriiodide and 0.047 part of titanium tetrachloride in 3 parts of toluene were then added with stirring. Polymerisation of the butadiene set in at once; it was conducted in such a manner that the temperature did not rise above 40° C. After 2 hours, the conversion was 92%.

A part of the polymer solution was stirred with 1.0% of 2:6-di-tertiary-butyl-4-methyl-phenol and 2% of disproportionated resinic acid, calculated on the polymer, and then introduced into hot water (6000 parts of water to 100 parts of polymer ) which was heated to 95 to 98° C. and to which 0.001% of a wetting agent (copolymer of isobutylene and maleic acid) had been added. The solvent distilled in the form of an aqueous mixture, the polybutadiene was obtained in lumps. The lumps were dried in vacuo at 60° C.

The cis-content of the polymer was 88.5%, the Mooney viscosity (ML4' 100° C.) 45.

(b) A part of the polymer solution was stirred with 35% of a highly aromatic mineral oil of a viscosity density constant of 0.950 (Ingralen 450) calculated on the polymer, as well as with 1% of 2:6-di-tertiary butyl-4-methylphenol and 2% of disproportionated resinic acid, and worked up by the method described under Example 1a. The product obtained had a Mooney viscosity (ML4' 100° C.) of 15 and a cold flow of 53 mg./min.; This product will hereinafter be referred to as II.

(c) A part of the polymer solution of Example 1a was stirred with a 5% solution of phosphrous oxychloride in toluene so that 0.24 part of phosphorus oxychloride was present to every 100 parts of polybutadiene. The solution was heated for 100 minutes to a temperature of 38 to 40° C. and stirred. A sample of the after-treated polybutadiene was isolated; the Mooney viscosity was 74. The solution was stirred with 1% of 2:6-di-tertiary-butyl-4-methyl-phenol, 2% of disproportionated resinic acid and 35% of highly aromatic mineral oil of a V-density constant of 0.950 (Ingralen 450) calculated on the polymer and worked up as in Example 1a. A product having a Mooney viscosity (ML4' 100° C.) of 41 and a cold flow of 9 mg./min. was obtained (hereinafter referred to as I).

(d) A polybutadiene solution was prepared under the conditions mentioned in Example 1a, the catalyst components being added in the following quantities: 0.18 part of aluminum triisobutyl, 0.0302 part of titanium 100° tetrachloride and 0.08 part of titanium butoxytriiodide to 100 parts of butadiene. After 2 hours, the conversion was 91%. A sample of the polymer was isolated; the Mooney value was 75. 1% of 2:6-ditertiary-butyl-4-methyl-phenol, 2% of disproportionated resinic acid and 35% of highly aromatic mineral oil of V-density constant 0.950 (Ingralen 450), calculated on the polymer, were stirred into the polymer solution.

The solution was worked up as in Example 1a. The oil-containing polybutadiene had a Mooney viscosity (ML4'

100° C.) of 40 and a cold flow of 27 mg./min. (hereinafter referred to as III).

(e) Preparation of the mixture and comparing the behaviour in working up; 105 parts of Samples I to III are mixed with 30 parts of natural rubber on rollers and then worked up into a tread compound according to the following prescription:

| | Parts by weight |
|---|---|
| Total rubber (including oil) | 135 |
| ISAF carbon black | 48 |
| Coumarone resin | 5 |
| Stearic acid | 2 |
| Zinc oxide | 2 |
| N-cyclohexyl-2-benzthiazyl-sulphenamide | 1.1 |
| Diphenylguanidine | 0.3 |
| Sulphur | 2.0 |

The ease of processability is estimated in points. 1=very good 5=poor.

| | Sample No. | | |
|---|---|---|---|
| | I | II | III |
| Mixing-properties | 1 | 1 | 2–3 |
| Extrusion-properties | 1 | 1 | 2 |
| Tackyness | 2 | 2 | 3 |

| | Sample No. | | |
|---|---|---|---|
| | I | II [1] | III |
| Properties of vulcanisate: | | | |
| Tensile strength, kg./cm.² | 160 | 131 | 147 |
| Modulus 300/500, percent | 50/101 | 40/95 | 45/110 |
| Elongation at break, percent | 600 | 640 | 580 |
| Rebound-elasticity percent at 25/75° C | 40/45 | 34/39 | 37/41 |
| Heat build up (ΔT) in the Goodrich flexometer ° C. after 25 minutes | 39 | 46 | 41 |

[1] The oil begins to exude after a short time.

(f) Comparison of the coefficients of friction: To determine the coefficients of friction, a sample of vulcanisate was loaded by a given weight and kept on a rotating plate of asphalt road covering by a dynamometer which measures the frictional force: the apparatus is mounted in an air-conditioned chamber. The rotating plate is kept wet during the experiment. The ratio of frictional force to compression load gives the coefficient of friction. This is a measure of the skid resistance on wet asphalt. The values obtained are proportional to those found in a test run. Tests (a) to (e) were repeated, only the type of oil being changed:

| | Coefficient of friction | |
|---|---|---|
| | Sample No. | |
| Type of oil | I | II |
| Paraffinic (viscosity-density constant 0.788 Ingraplast SRL) | 0.64 | 0.63 |
| Naphthenic (viscosity density constant 0.875 Ingraplast S) | 0.69 | 0.67 |
| Highly aromatic (viscosity density constant 0.950 Ingralen 450) | 0.74 | 0.70 |

(g) 105 parts of Samples I to III were mixed with 30 parts of butadiene-styrene rubber on a mill and then compounded according to the following recipe:

| | Parts by weight |
|---|---|
| Total rubber (including oil) | 135 |
| ISAF carbon black | 48 |
| Coumarone resin | 5 |
| Stearic acid | 2 |
| Zinc oxide | 5 |
| N-cyclohexyl-2-benzthiazyl-sulphenamide | 1.4 |
| Diphenylguanidine | 0.3 |
| Sulphur | 1.8 |

Estimating the processability as under (e):

| | Sample No. | | |
|---|---|---|---|
| | I | II | III |
| Mixing-properties | 2 | 2 | 4 |
| Extrusion-test | 2 | 2 | 3–4 |
| Tackiness | 2–3 | 2 | 4 |
| Properties of vulcanisate: | | | |
| Tensile strength, kg./cm.² | 154 | 127 | 143 |
| Elongation at break, percents | 570 | 612 | 552 |
| Rebound-elasticity in percent 25/75° C | 38/43 | 30/34 | 33/38 |
| Heat build up (ΔT) in the Goodrich flexometer ° C. after 25 minutes | 43 | 52 | 46 |

We claim:
1. In a process for the preparation of a rubbery diene polymer, the steps which comprise preparing a butadiene polymer in solution by the polymerization in an inert organic solvent of 1,3-butadiene monomer, alone or with up to 15% by weight styrene or isoprene, and subsequently treating the resulting solution with a cyclising agent in an amount of 0.1–5.0 millimols of cyclising agent per 100 grams of butadiene polymer so that the loss of double bonds in the polymer is below 20% and its Mooney viscosity is between 60 and 120, and oil-extending the cyclised butadiene polymer by admixing therewith 30 to 70 parts by weight of a highly aromatic rubber extender oil having a viscosity density constant of at lease 0.950 per 100 parts by weight of said butadiene polymer, said cyclising agent being a halide of an element of Groups III to VI of the Periodic System.

2. The process of claim 1 wherein the polymerization is conducted in the presence of an organometallic catalyst.

3. The process of claim 1 wherein the oil is added to the polymer solution after cyclisation.

4. The process of claim 1 wherein the oil is added to the polymer solution prior to cyclisation.

5. A process for producing a synthetic diene rubber which comprises polymerizing 1,3-butadiene in an inert organic solvent, alone or with up to 15% by weight of styrene or isoprene, to form a solution of a high molecular weight 1,4-cis butadiene polymer containing at least 80% 1,4-cis linkages, treating the resultant polymer solution with a cyclising agent in an amount of 0.1–5.0 millimols of cyclising agent per 100 grams of butadiene polymer so that the loss of double bonds in the polymer is below 20% and its Mooney viscosity is between 60 and 120, oil-extending the cyclised polymer by admixing therewith 30 to 70 parts by weight of a highly aromatic rubber extender oil having a viscosity density constant of at least 0.950 per 100 parts by weight of said butadiene polymer, and blending the cyclised polymer with up to 30% by weight of natural rubber or butadiene-styrene rubber, said cyclising agent being a halide of an element of Groups III to VI of the Periodic System.

6. An oil-extended butadiene polymer mixture consisting of (a) 30 to 70 parts by weight of a highly aromatic extender oil having a viscosity density constant of at least 0.950, and (b) 100 parts by weight of a rubbery cyclised butadiene polymer selected from the group consisting of (1) cyclised polybutadiene and (2) a cyclised copolymer of at least 85% by weight of butadiene and up to 15% by weight of styrene or isoprene, said butadiene polymer having been prepared in solution in the presence of an organometallic catalyst and having been thereafter cyclised with 0.3–5 millimols of cyclising agent per 100 grams of butadiene polymer so that the loss of double bonds in the polymer is belw 20% and its Mooney viscosity is between 60 and 120, said cyclising agent being a halide of an element of Groups III to VI of the Periodic System.

7. The composition of claim 6 wherein said butadiene polymer is cyclised 1,4-cis polybutadiene containing at least 80% 1,4-cis linkages.

8. A synthetic diene rubber consisting essentially of the oil-extended butadiene polymer of claim 7, admixed with 1–30% by weight of natural rubber or styrene/butadiene rubber.

References Cited

UNITED STATES PATENTS

| | | | |
|---|---|---|---|
| 2,886,561 | 5/1959 | Reynolds et al. | 260—94.9 |
| 2,555,068 | 5/1951 | Van Veersen | 260—94.7 |
| 3,211,710 | 10/1965 | Hendriks | 260—85.3 |
| 3,245,974 | 4/1966 | Angelo | 260—94.2 |
| 3,060,989 | 10/1962 | Railsback et al. | 260—5 |
| 3,299,032 | 1/1967 | Rollmann | 260—94.7 |
| 3,081,276 | 3/1963 | Snyder et al. | 260—33.6 |
| 3,264,237 | 8/1966 | Sarbach et al. | 260—23.7 |
| 3,373,132 | 3/1968 | Sutter et al. | 260—33.6 |

FOREIGN PATENTS

| | | |
|---|---|---|
| 992,210 | 5/1965 | Great Britain. |
| 913,298 | 12/1962 | Great Britain. |
| 483,815 | 6/1952 | Canada. |

MURRAY TILLMAN, Primary Examiner

M. J. TULLY, Assistant Examiner

U.S. Cl. X.R.

260—33.6, 41.5, 45.95, 94.7, 894